(12) United States Patent
Schwartz et al.

(10) Patent No.: US 11,479,452 B2
(45) Date of Patent: Oct. 25, 2022

(54) TILTABLE VEHICLE LIFT

(71) Applicant: The Aluminum Trailer Company, Nappanee, IN (US)

(72) Inventors: Seth Schwartz, Walkerton, IN (US); Christopher Klassen, Goshen, IN (US); Austin Ganger, Indianapolis, IN (US)

(73) Assignee: The Aluminum Trailer Company, Nappanee, IN (US)

( * ) Notice: Subject to any disclaimer, the term of this patent is extended or adjusted under 35 U.S.C. 154(b) by 190 days.

(21) Appl. No.: 16/947,743

(22) Filed: Aug. 14, 2020

(65) Prior Publication Data

US 2021/0070592 A1 Mar. 11, 2021

Related U.S. Application Data

(60) Provisional application No. 62/896,873, filed on Sep. 6, 2019.

(51) Int. Cl.
| | |
|---|---|
| *B66F 7/22* | (2006.01) |
| *B66F 7/28* | (2006.01) |
| *B60P 3/07* | (2006.01) |

(52) U.S. Cl.
CPC ............ *B66F 7/22* (2013.01); *B66F 7/28* (2013.01); *B60P 3/07* (2013.01)

(58) Field of Classification Search
CPC .... B66F 1/00; B66F 1/02; B66F 1/025; B66F 1/04; B66F 7/02; B66F 7/04; B66F 7/28; B60P 3/07; B60P 1/04; B60P 1/16; B60P 1/22

USPC .................................... 254/3 C, 93 L, 89 R
See application file for complete search history.

(56) References Cited

U.S. PATENT DOCUMENTS

| | | | | |
|---|---|---|---|---|
| 2,238,573 | A | * | 4/1941 | Steedman ................ B66F 7/02 |
| | | | | 187/209 |
| 3,985,207 | A | | 10/1976 | Petit |
| 4,300,659 | A | | 11/1981 | Silverstrand |
| 5,899,299 | A | | 5/1999 | Chisum |
| 5,904,339 | A | | 5/1999 | Flinn |
| 7,143,869 | B1 | | 12/2006 | Chance |
| 7,997,387 | B2 | | 8/2011 | Rauch et al. |
| 8,708,107 | B2 | | 4/2014 | Finkbeiner |
| 9,751,737 | B2 | * | 9/2017 | Taylor .................... B66F 7/025 |
| 9,975,749 | B2 | | 5/2018 | Roberson et al. |
| 2011/0095247 | A1 | | 4/2011 | Adams |
| 2012/0018255 | A1 | * | 1/2012 | Gross ...................... B66F 7/28 |
| | | | | 187/203 |
| 2016/0185580 | A1 | | 6/2016 | Luinge |

* cited by examiner

*Primary Examiner* — Lee D Wilson
*Assistant Examiner* — Alberto Saenz
(74) *Attorney, Agent, or Firm* — Woodard, Emhardt, Henry, Reeves & Wagner, LLP

(57) ABSTRACT

A vehicle lift includes a lift platform which can be selectively moved in a range between one or more raised positions which are level from the front to the rear and a lowered position where the lift platform is tilted for loading and unloading. A vehicle may be supported on the lift platform. The vehicle lift may be arranged in a trailer.

20 Claims, 8 Drawing Sheets

TILTABLE VEHICLE LIFT

CROSS-REFERENCE TO RELATED APPLICATIONS

The application claims the benefit of application 62/896,873 filed on Sep. 6, 2019, which is incorporated herein by reference.

FIELD OF THE DISCLOSURE

The present disclosure deals with vehicle lifts and particularly vehicle lifts that incorporate a tiltable aspect. In some embodiments the vehicle lifts are arranged in trailers.

BACKGROUND

The present disclosure deals with vehicle lifts, for example arranged within a trailer. The lift can be used to raise a vehicle to provide clearance beneath it. This may allow two vehicles to be vertically stacked and/or provides a storage, work or activity area below the raised vehicle. In most vehicle lifts, the lift platform remains level at all times and may have a limit to how close the lift platform can approach the floor, which can make it difficult to load vehicles with a low clearance onto the lift platform without a portable ramp, an inset cavity or a bulky transition arrangement.

SUMMARY

The present disclosure provides a lift with a lift platform that incorporates a tilt function, allowing for a load such as a vehicle to be more easily moved onto or off of the lift platform. An illustrative embodiment of a vehicle lift includes a forward support post and a rear support post. A lift platform extends between the forward support post and the rear support post. A forward support engages the forward support post and supports a forward portion of the lift platform. A rear support engages the rear support post and supports a rear portion of the lift platform. A front tilt notch is defined adjacent a lower end of the forward support post and a rear tilt notch is defined adjacent a lower end of the rear support post. The front tilt notch is arranged at a height greater than the height of the rear tilt notch. The lift platform is movable to a lowered position where the forward support engages the front tilt notch and the rear support engages the rear tilt notch so that the lift platform is supported at an angle relative to the support surface.

In an alternate embodiment, a vehicle lift includes a plurality of support posts arranged on a support surface, including a forward support post and a rear support post. A lift platform is operably supported by the support posts and movable along a height of the posts between one or more raised positions wherein the lift platform is parallel to the support surface and a lowered position. A forward support engage the forward support post and supports a forward portion of the lift platform. A rear support engages the rear support post and supports a rear portion of the lift platform. The forward support post defines a front tilt position engaged by the forward support when the lift platform is in the lowered position and the rear support post defines a rear tilt position engaged by the rear support when the lift platform is in the lowered position. The front tilt position is higher in height than the rear tilt position so that the lift platform is arranged at an angular orientation relative to the support surface.

In certain embodiments, the vehicle lift includes a forward ladder rail arranged in a forward support post and a rear ladder rail arranged in a rear support post. The forward ladder rail and the rear ladder rail define a plurality of support notches extending along a portion of the vertical length of each ladder rail. Each support notch in the forward ladder rail is paired with a support notch in the rear ladder rail. A front tilt notch is defined below the support notches in the forward ladder rail and a rear tilt notch is defined below the support notches in the rear ladder rail. The front tilt notch is arranged at a height above the rear tilt notch. A front latch mechanism in the forward support is arranged to selectively engage a notch in the forward ladder rail corresponding to the height of the lift platform and a rear latch mechanism in the rear support is arranged to selectively engage a notch in the rear ladder rail corresponding to the height of the lift platform. The lift platform is supported at an angle to the support surface when the front latch mechanism engages the front tilt notch and the rear latch mechanism engages the rear tilt notch.

Further objects, features and advantages of the present disclosure shall become apparent from the detailed drawings and descriptions provided herein.

BRIEF DESCRIPTION OF THE DRAWINGS

FIG. 1 illustrates the lift platform in both a lowered, tilted position and a raised position.

DESCRIPTION OF DISCLOSED EMBODIMENTS

Figure 1:
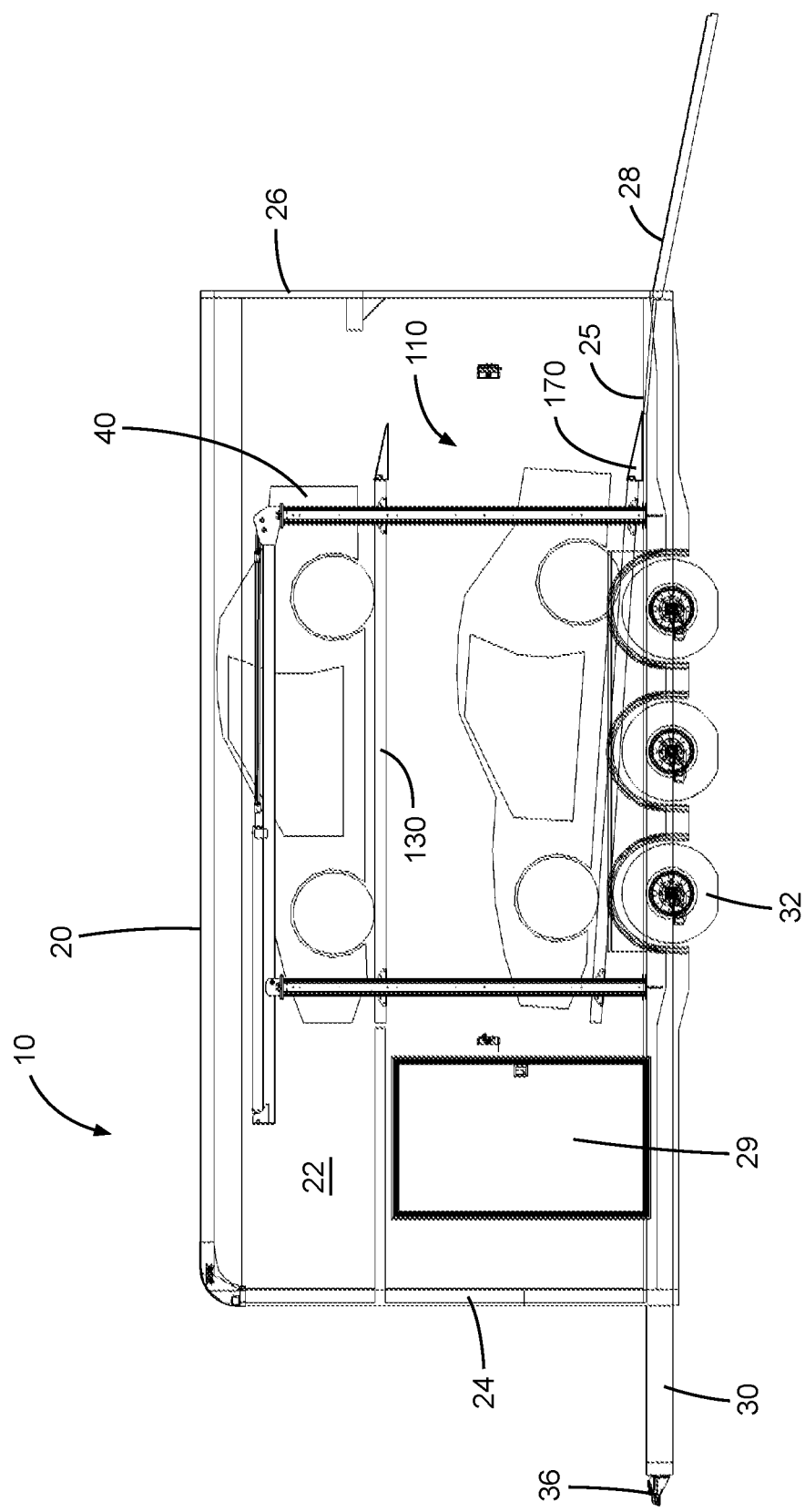
FIG. 1 is a representative semi-transparent side view of a trailer showing a representative vehicle on an embodiment of a vehicle lift of the present disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

In most vehicle lifts, the lift platform remains level at all times, which can make it difficult to move a load, such as a vehicle with a low clearance, onto the lift platform without a ramp or similar bulky transition tool. The present disclosure provides a vehicle lift that incorporates a rearward tilt function for the lift platform, allowing a load such as a vehicle to be more easily moved onto the lift platform.

Figure 2:
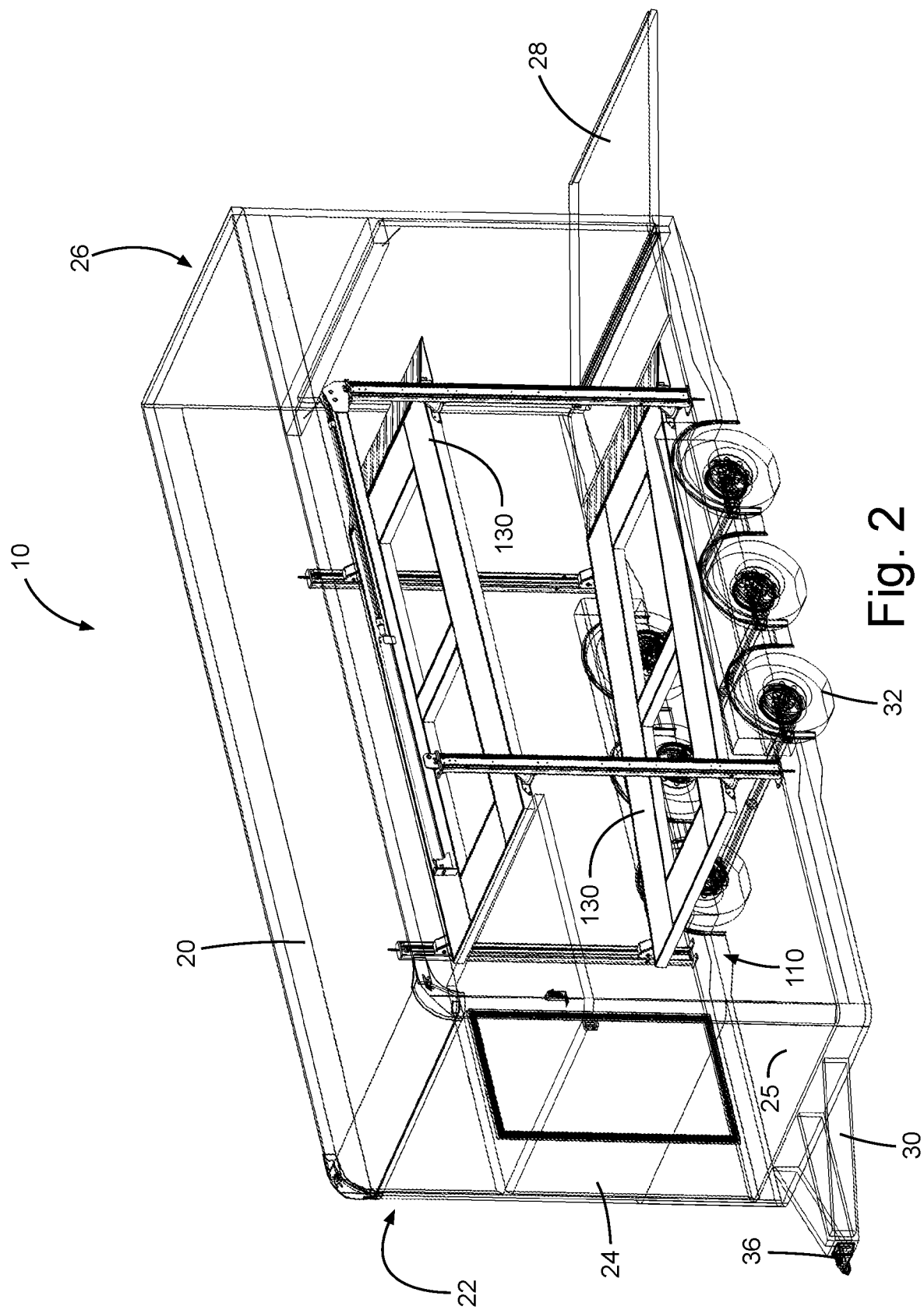
FIG. 2 is a perspective semi-transparent view of the trailer with, the lift and lift platform of FIG. 1 in both a lowered, tilted position and a raised position.

FIGS. 1 and 2 provide representative illustrations of vehicle lift 110 arranged within a trailer 10. Trailer 10 is shown in a semi-transparent manner for ease of illustration. A typical trailer 10 includes a structure 20 arranged on a frame 30. Many trailer structures define an interior volume enclosed by sidewalls 22, a front wall 24, a rear wall 26, a roof and a floor 25. Selectively openable rear doors or a tailgate 28 may be arranged in rear wall 26. In some arrangements tailgate 28 may form a ramp. Optionally structure 20 may define other openings such as a side door 29, windows, vents, etc. The trailer frame 30 is supported on and movable above a support surface, for example with a plurality of wheels 32. Frame 30 may extend forward to a trailer hitch 36, allowing trailer 10 to be towed. Different versions and variations on trailer 10 may be used with embodiments of vehicle lift 110.

Vehicle lift 110 includes a lift platform 130 which can be selectively moved between one or more raised positions and a lowered position. In the raised positions lift platform 130 is level from the front to the rear and is substantially parallel to the support surface. In the lowered position, lift platform 130 assumes a tilted loading and unloading position. A load, such as a vehicle 40, may be supported on the lift platform. For ease of comparison, FIGS. 1 and 2 illustrate the lift platform 130 and a representative vehicle 40 twice, namely in both a raised position and the lowered position. However, in practice the disclosed embodiments operate with a single, movable lift platform 130. Lift platform 130 may be selected to be an appropriate length such as fourteen, sixteen or eighteen feet. Preferably the length of lift platform 130 is centered between the front and rear support posts.

In other embodiments vehicle lift 110 may be arranged directly on a floor or ground-based support surface without a trailer. As examples, this could include a garage, a storage building, a mechanic's work area or outdoors.

Figure 3:
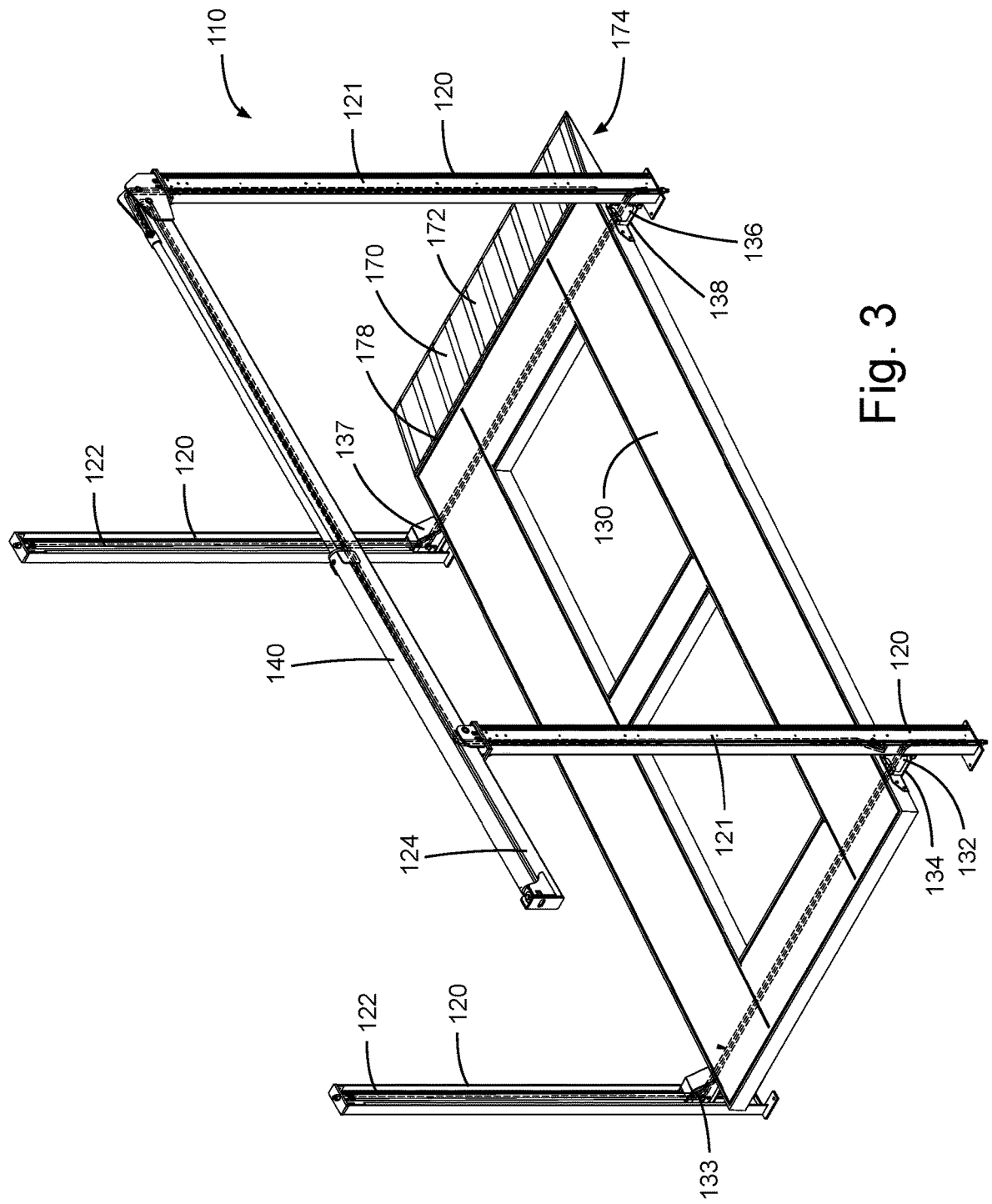
FIG. 3 is a perspective view of an embodiment of the vehicle lift shown in FIG. 1.
Figure 4:
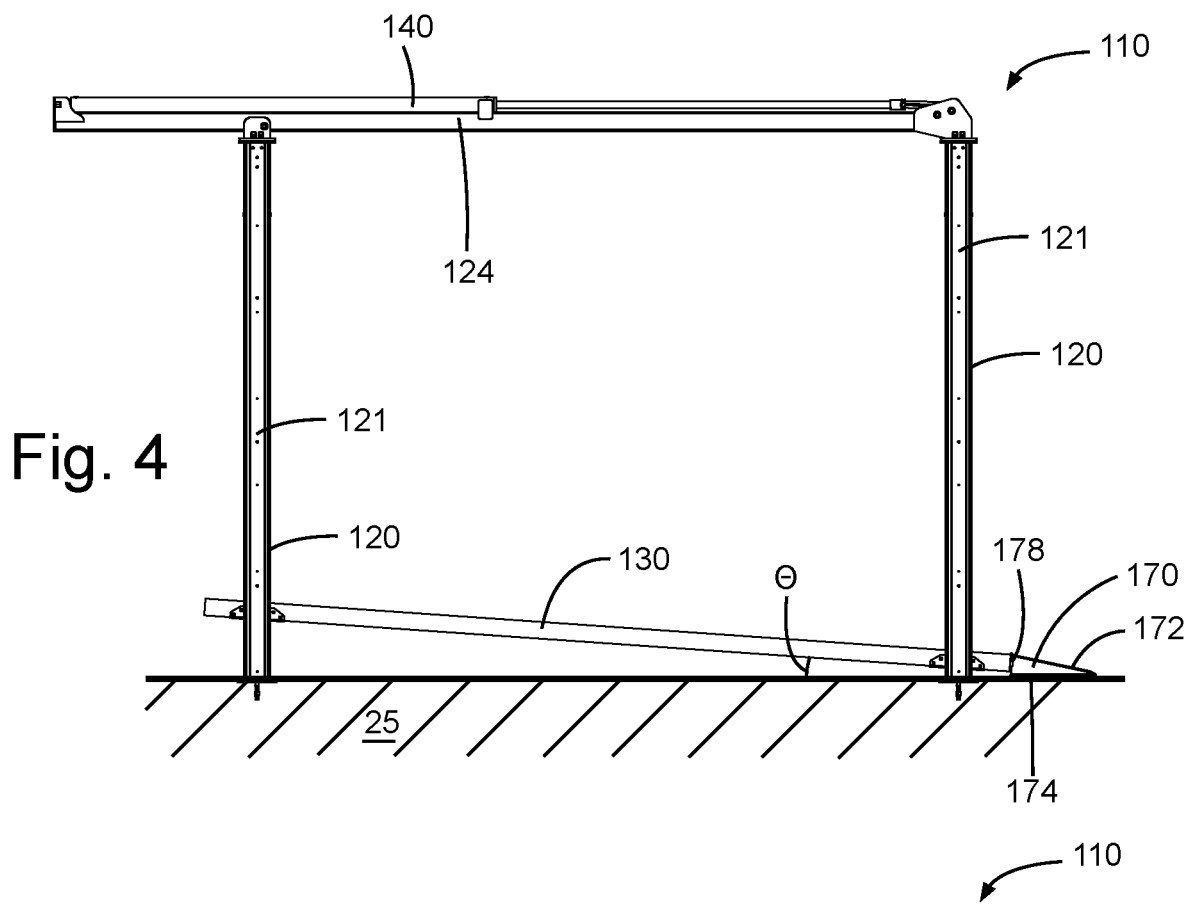
FIG. 4 is a side view of the vehicle lift of FIG. 3.

Vehicle lift 110 is illustrated in FIGS. 3 and 4 without trailer 10. Lift 110 includes four vertically arranged support posts 120. In the illustrated embodiments, support posts 120 each have an approximately rectangular shaped profile with an inward facing open side, forming approximately a C-shaped or U-shaped interior cross section. Other cross-sectional shapes may be used as desired. Two posts 120 are arranged adjacent each lateral side of lift platform 130. The lower end of each support post 120 is typically anchored to the underlying support surface such as trailer floor 25 or a ground based support surface. Alternately, posts 120 may remain in place without being anchored. Posts 120 may be of equal height, but optionally may be of unequal heights in certain embodiments. The heights of posts 120 must be sufficient to enable the desired range of movement of lift platform 130. Front and rear lift-side posts 121 are arranged on one lateral side of lift 110 and are utilized for lifting and holding the lift platform 130, while front and rear support-side posts 122 are arranged on the opposite lateral side of lift 110 and assist to support the lift platform 130. Lift platform 130 includes forward support 132 and rear support 136 which engage the lift-side posts 121. Lift platform 130 also includes forward support 133 and rear support 137 which engage the support-side posts 122. Supports 132, 133, 136 and 137 may be engaged and limited to be only vertically movable along the heights of support posts 120. A transverse beam 124 extends in a front-to-rear direction and is secured to the upper ends of lift-side posts 121.

Figure 5:
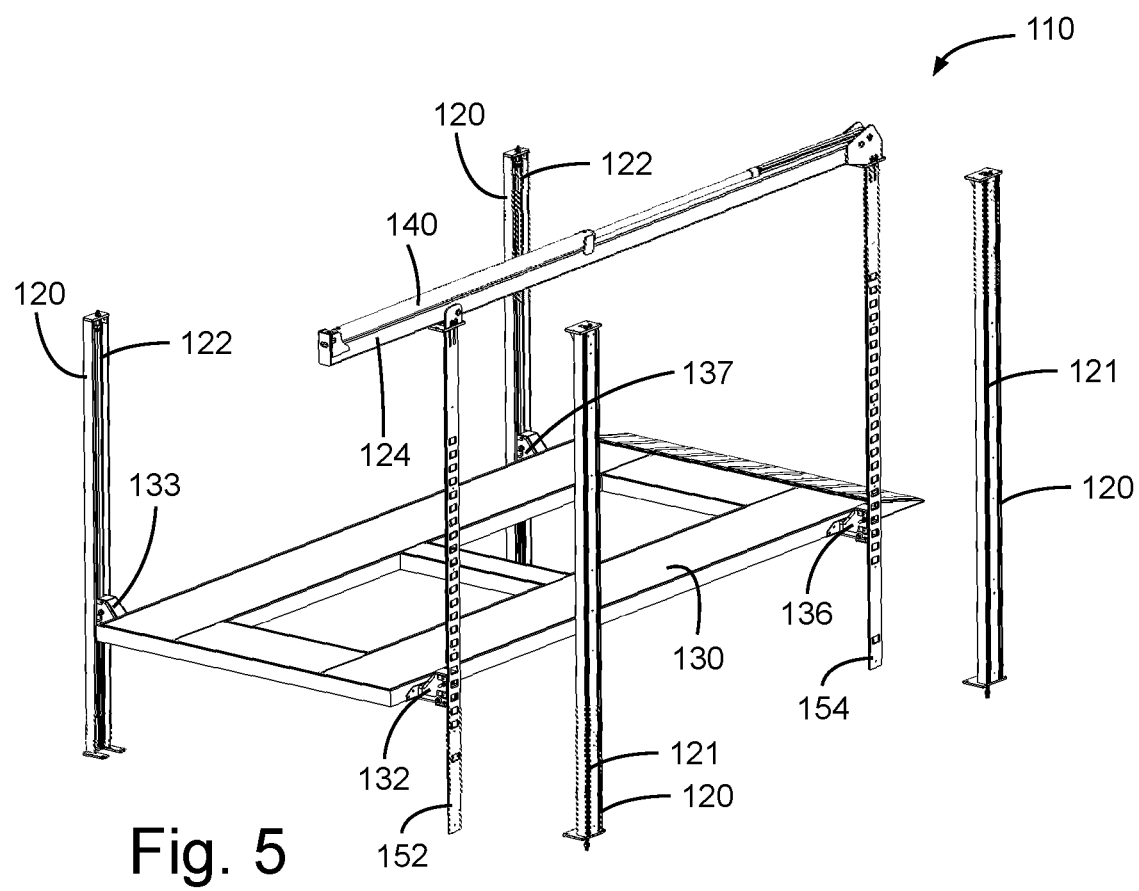
FIG. 5 is a perspective, partially exploded view of the vehicle lift of FIG. 3.
Figure 7A:
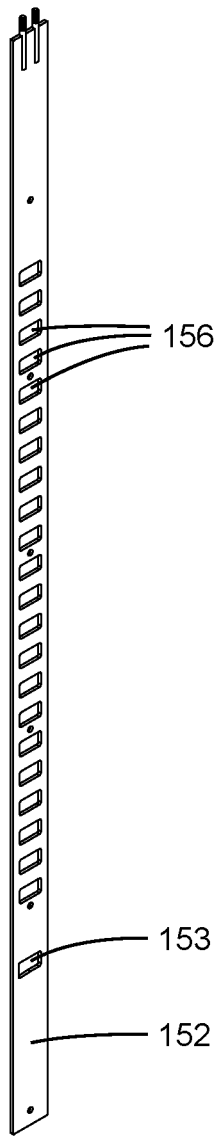
FIG. 7A is a perspective view of the forward ladder rail of the vehicle lift of FIG. 3.
Figure 7B:
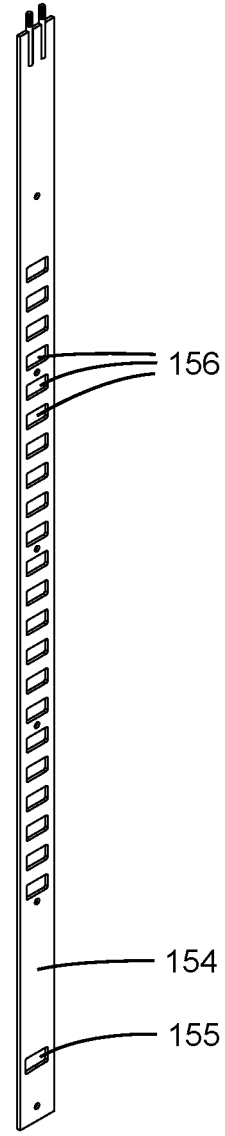
FIG. 7B is a perspective view of the rear ladder rail of the vehicle lift of FIG. 3.

Lift-side posts 121 include forward ladder rail 152 and rear ladder rail 154. Forward ladder rail 152 and rear ladder rail 154 are vertically arranged and are typically mounted within the interior cross-sections of lift-side posts 121. Ladder rails 152, 154 are illustrated in the partially exploded view of FIG. 5 and in more detail in FIGS. 7A and 7B. The base end of each ladder rail is supported by the support surface or by lift-side posts 121, such as by resting a ladder rail end on a post base plate. Ladder rails 152, 154 each define a sequential series of a plurality of support notches 156 extending along a portion of the vertical length of each ladder rail. In some embodiments, each support notch 156 in forward ladder rail 152 is paired with a support notch 156 of equal height in rear ladder rail 154.

Additionally, forward ladder rail 152 defines a front tilt notch 153 defined below the support notches. Rear ladder rail 154 defines a rear tilt notch 155 defined below the support notches. Front tilt notch 153 and rear tilt notch 155 are illustrated near the lower ends of the respective ladder rails. Front tilt notch 153 is arranged at a height above rear tilt notch 155.

An extension and retraction mechanism, such as hydraulic cylinder 140, may be horizontally arranged on or within transverse beam 124. Alternate extension and retraction mechanisms could include a worm gear piston in a cylinder or a rotatable reel arrangement. The extension and retraction mechanism controls front and rear linkages such as front lift chain 142 and rear lift chain 146, illustrated in FIG. 6. Front lift chain 142 has an upper end 142a coupled to the extendable and retractable piston rod of hydraulic cylinder 140. The interim length of front lift chain 142 extends along transverse beam 124 to a pulley 143a adjacent rear lift post 121, and then downward around pulley 143a. Front lift chain 142 then extends forward along transverse beam 124 to a pulley 143b adjacent the forward lift-side post 121. Front lift chain 142 then extends downward within forward lift-side post 121. A lower end 142b of front lift chain 142 is secured to forward support 132 for lift platform 130. Operation of the extension and retraction mechanism and consequent movement of lift chain 142 correspondingly raises and lowers forward support 132.

Figure 6:
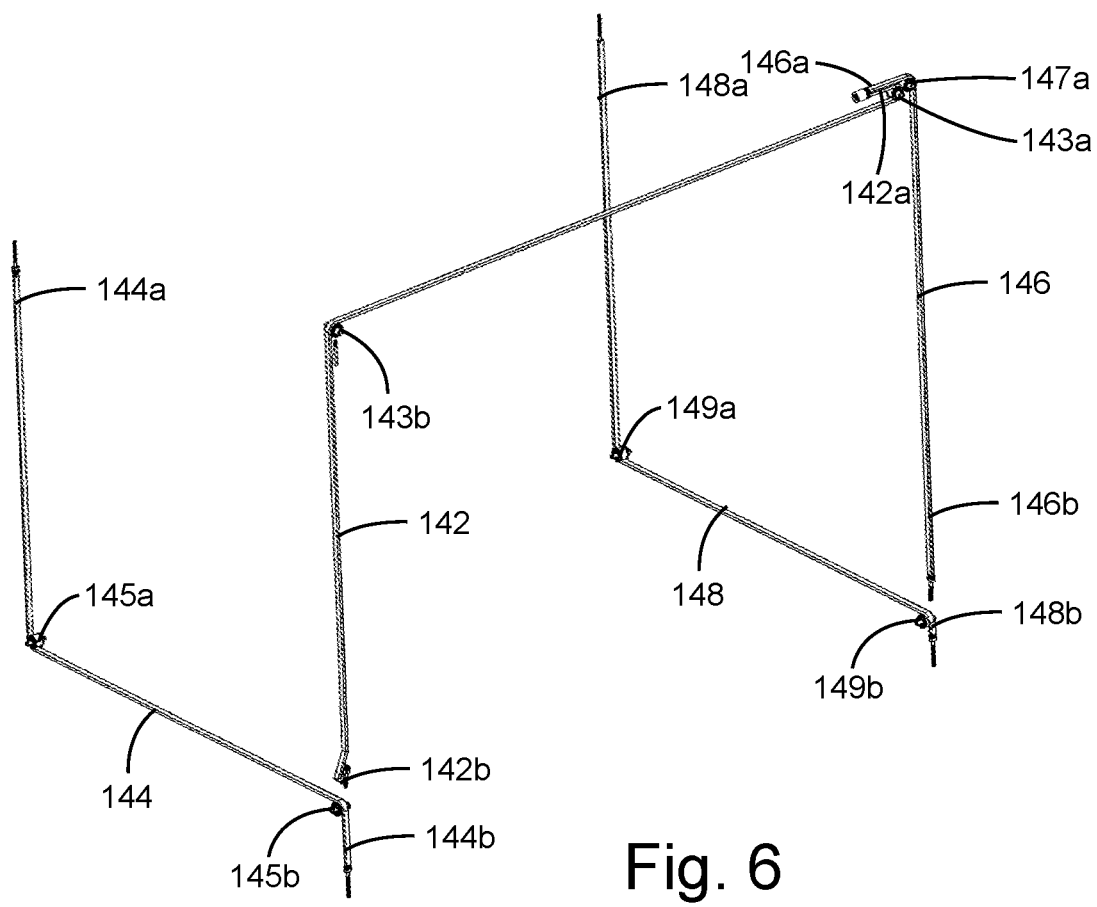
FIG. 6 is a perspective view of the linkage arrangement in the vehicle lift of FIG. 3.

Hydraulic cylinder 140 also controls rear lift chain 146 illustrated in FIG. 6. Rear lift chain 146 has an upper end 146a also coupled to the piston rod of hydraulic cylinder 140. The interim length of rear lift chain 146 extends along transverse beam 124 to a pulley 147a adjacent rear lift-side post 121, and extends downward within rear lift-side post 121. A downward end 146b of rear lift chain 146 is secured to rear support 136 for lift platform 130. Operation of the extension and retraction mechanism and consequent movement of lift chain 146 correspondingly raises and lowers rear support 136. The lengths and pathways of lift chains 142 and 146 are selected so that forward support 132 is synchronized to remain equal in height with rear support 136 to maintain lift platform in a level orientation, except when tilted as discussed herein.

References to forward and rearward herein are for ease of illustration and are not intended to be limiting. For instance, in alternate embodiments, the direction of cylinder 140 could be reversed and the relative positions of front lift chain 142 and rear lift chain 146 could be reversed.

Vehicle lift 110 also incorporates linkages such as a forward lateral support chain 144 and a rear lateral support chain 148. Each support chain 144 or 148 has an upper end 144a or 148a anchored adjacent an upper end of a respective support-side post 122. Each support chain 144 or 148 has an interim portion which extends within the respective support-side post 122 downward to a pulley 145a or 149a positioned with a respective forward support 132 or rear support 136 for lift platform 130. Each support chain 144 or 148 then extends laterally under lift platform 130 to a pulley 145b or 149b positioned with the corresponding forward support 132 or rear support 136 adjacent a lift-side post 121. Each support chain 144 or 148 then extends downward from the respective pulley 145b or 149b and has a lower end 144b or 148b anchored adjacent a lower end of a respective lift-side post 121.

During raising and lowering of lift platform 130, the ends of support chains 144, 148 do not move. Instead, as the heights of supports 132, 133, 136 and 137 change, as controlled by the extension and retraction mechanism, lift platform 130 translates along the intermediate length of support chains 144 and 148, with the points at where support chains 144 and 148 encounter the support pulleys varying in response to the height of lift platform 130. The fixed and anchored lengths of the support chains and the fixed spacing of the pulleys maintain the lateral sides of lift platform 130 at equal lateral heights as it is raised and lowered.

The illustrated embodiment uses linkages shown as a series of leaf or roller chains with one or more strands as the lift chains and support chains. In alternate embodiments, other linkage arrangements may be used in place of the illustrated chains, such as, but not limited to: coil chains, metal cables and/or ropes with sufficient strength and durability. FIG. 6 illustrates pulleys to guide the illustrated chains. In other embodiments other linkage guides such as rollers, sliding channels or gears may be used.

The laterally extending portions of each support chain 144 or 148 may be arranged within respective lateral cross-beams 134 or 138. Lateral cross-beams 134 and 138 support lift platform 130. Lift platform 130 and/or cross-beams 134 and 138 may be pivotally mounted to allow lift platform 130 to tilt rearward in the lowered position.

Figure 8A:
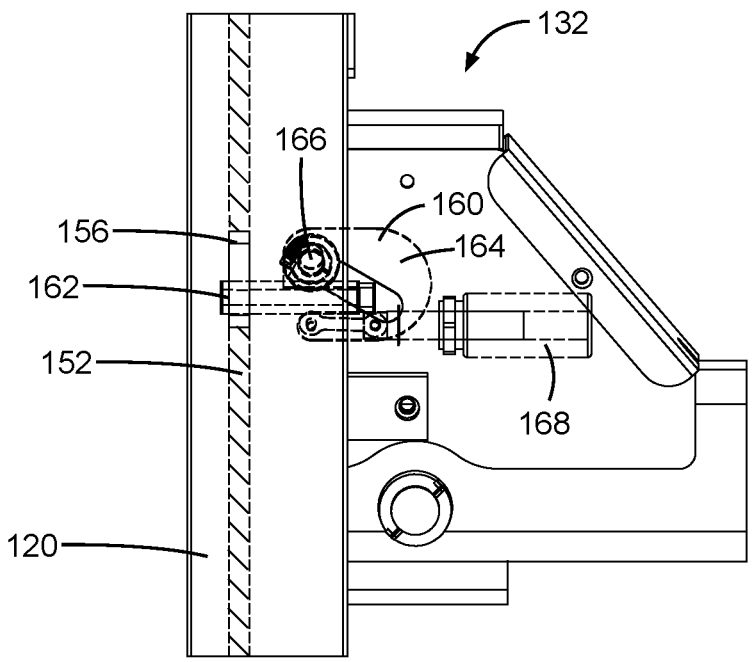
FIG. 8A is a side, semi-transparent view of a latch mechanism of the vehicle lift of FIG. 3 in a latched position.
Figure 8B:
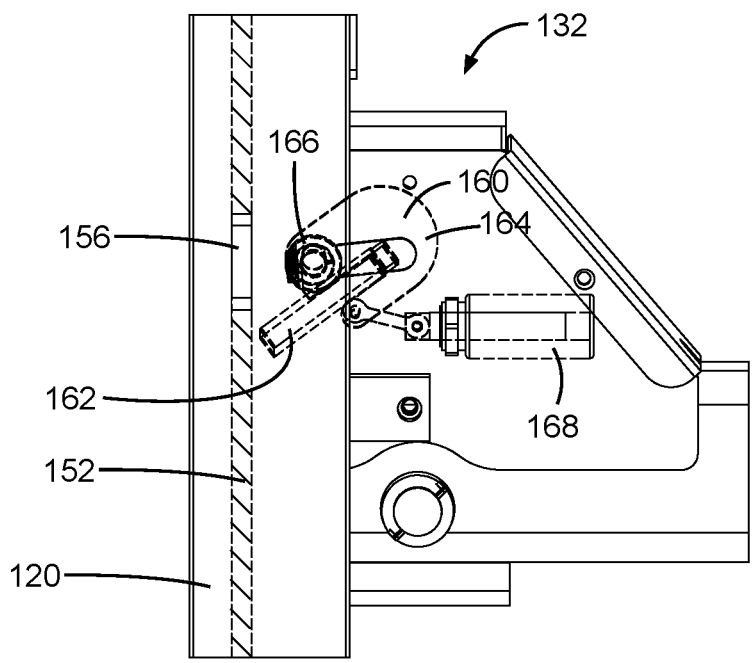
FIG. 8B is a side, semi-transparent view of the latch mechanism of FIG. 8A in an unlatched position.
Figure 8C:
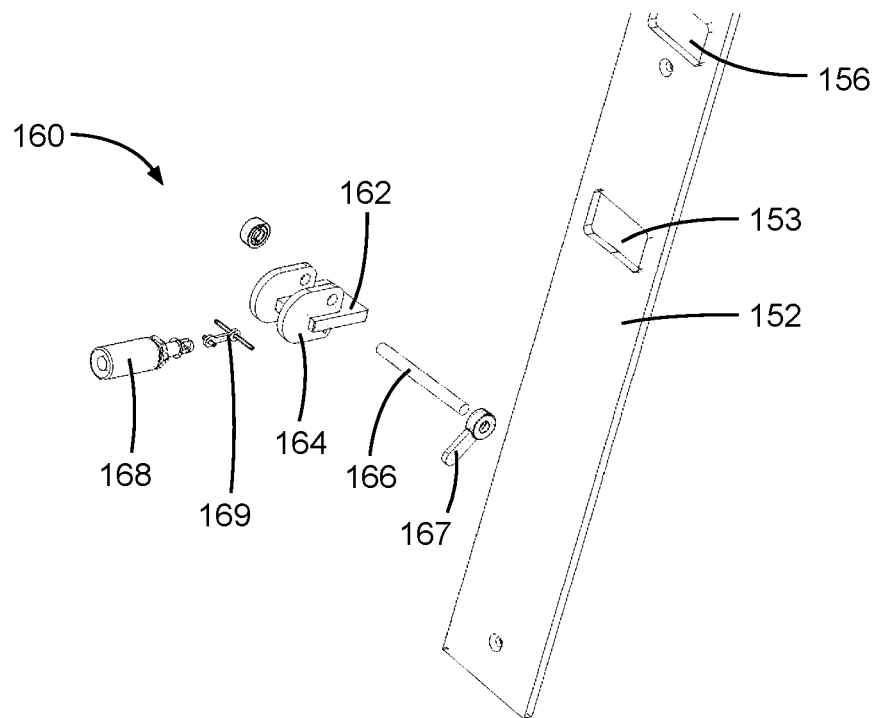
FIG. 8C is a perspective, exploded view of the latch mechanism of FIG. 8A.

A front latch mechanism 160, as illustrated in FIGS. 8A-C, is arranged in forward support 132. A similar rear latch mechanism is arranged in rear support 136. The interaction between front latch mechanism 160 mounted in forward support 132 and forward ladder rail 152 is discussed in detail, with the interaction between the rear latch mechanism mounted in rear support 136 and rear ladder rail 154 being the same. In certain embodiments, there is only a single front latch mechanism 160 and a single rear latch mechanism, both arranged on the same lateral side of lift platform 130 to engage the lift-side posts 121.

Latch mechanism 160 includes a base 164 pivotally mounted to forward support 132 via pivot axle 166. In the illustrated embodiment, base 164 includes two parallel vertical plates. A latch arm 162 extends perpendicularly from base 164 toward ladder rail 152 (shown in cross-section in FIGS. 8A-B. Actuator 168, such as an electrical solenoid, is connected to base 164 via linkage pin arrangement 169. Actuator 168 includes a piston arm which can be operated to extend and retract and correspondingly to selectively rotate base 164 in conjunction with latch arm 162. Latch mechanism 160 is rotatable between a support position and release position within a limited pivot range. In some embodiments, latch mechanism 160 is mounted in an eccentric manner, with pivot axle 166 offset from the center of mass of the latch mechanism 160, wherein the mass of base 164 and latch arm 162 bias latch 160 to rotate latch arm 162 upward and toward ladder rail 152, illustrated as a clockwise direction in FIG. 8A.

FIG. 8A illustrates latch mechanism 160 in the support position with latch arm 162 extending into and engaged with a support notch 156 in forward ladder rail 152. In the support position latch mechanism 160 has reached the limit of its rotational range in one direction, illustrated as a limit to the clockwise rotation of latch 160 from the perspective of FIG. 8A. A pivot stop 167 secured to an end of axle 166 limits rotation of axle 166. In the support position, latch arm 162 bears against the lower face of notch 156. Correspondingly, the latch mechanism prevents downward movement of forward support 132 which in turn prevents downward movement of lift platform 130.

As the lift platform rises, latch arm 162 rises and disengages from the lower face of support notch 156. When latch arm 162 encounters the upper edge of notch 156, the edge urges latch 160 to rotate to a release position, illustrated as counter-clockwise movement from the perspective of FIGS. 8A and 8B. This removes latch arm 162 from notch 156. As the lift platform continues to rise, latch arm 162 travels along the inward facing surface of ladder rail 152 until aligned with the next notch 156. Latch mechanism 160 is biased to rotate into a support position. When latch arm 162 clears the lower edge of the next notch 156, latch mechanism 160 rotates toward a support position, causing latch arm 162 to enter and engage the next notch 156. As latch mechanism 160 sequentially moves into alignment with the series of notches 156, it engages each notch and then disengages from each notch as the rising motion continues, effectively operating as a ratchet mechanism. The ratchet mechanism allows the lift platform to freely rise, yet prevents the lift platform from descending unintentionally. When lift platform 130 is in the lowered position, latch mechanism 160 can be disengaged from tilt notches 153 or 155 in the same manner.

Figure 9:
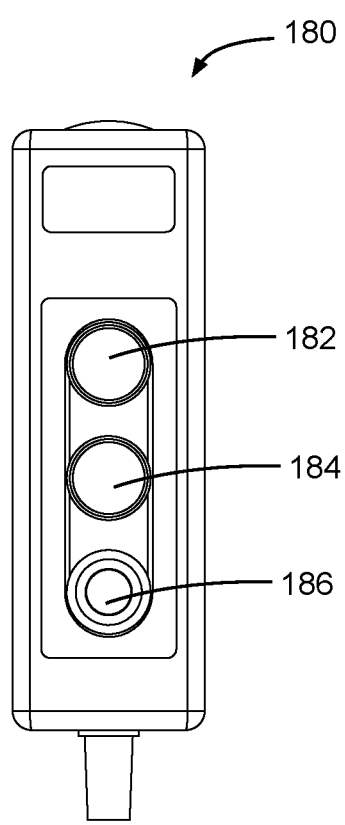
FIG. 9 is a view of a representative controller for the vehicle lift of FIG. 3.

When a user desires for the lift platform 130 to descend, the user can activate a controller 180 (illustrated in FIG. 9). Controller 180 can be used to selectively activate actuator 168. When actuator 168 is activated, it causes latch mechanism 160 to move to the release position, for instance by mechanically drawing base 164 rearward causing latch arm 162 to rotate out of a notch 156. This is illustrated as counter-clockwise rotation from the perspective of FIGS. 8A and 8B. When latch mechanism 160 is in the release position, cylinder 140 may be extended causing lift platform 130 to descend. Upon release of the controller 180, actuator 168 is deactivated, allowing latch mechanism 160 to again be biased toward the support position and to engage the next notch it is aligned with. In some embodiments, latch mechanism 160 is configured to automatically engage each successive notch as it is lowered unless actuator 168 is holding latch mechanism 160 in the release position.

Lift platform 130 is placed in the tilt position, as illustrated in FIGS. 3 and 4, by lowering lift platform below the series of paired support notches 156 in forward ladder rail 152 and rear ladder rail 154. As lift platform 130 approaches the bottom of its travel range, actuator 168 is released. This allows the latch mechanism 160 in forward support 132 to engage front tilt notch 153 when it reaches alignment. This locks the forward portion of lift platform 130 supported by cross-beam 134 at the height of front tilt notch 153. Then, as the extension and retraction mechanism continues to operate, the rearward portion of lift platform 130 continues to descend. This allows the latch mechanism 160 in rear support 136 to become aligned with and engage rear tilt notch 155. This locks the rear portion of lift platform 130 supported by cross-beam 138 at the height of rear tilt notch 155. In some embodiments, forward support 132 and rear support 136 are limited from travelling lower than front tilt notch 153 and rear tilt notch 155.

Due to the difference in height between front tilt notch 153 and rear tilt notch 155, in the lowered position lift platform is supported at an angle θ relative to the support surface such as floor 25. An example angle is four degrees (4°). The angle of inclination θ can be set when designing the ladder rails by setting the heights of the respective front and rear tilt notches. The rear edge of lift platform 130 is positioned with a relatively lower and angled profile closely adjacent to or abutting the support surface. This minimizes any height difference when a load is rolled on to or off of the lift platform from the support surface. In some embodiments, lower rear edge of lift platform 130 is supported adjacent to but slightly spaced above the support surface so that the lift platform does not touch the support surface. This minimizes a potential stress load at the junction of the lift platform 130 and optional ramp extension 170. It also prevents lift platform 130 from marking or deforming the support surface.

Optionally lift platform 130 may incorporate a ramp extension 170 which extends from the rear edge of lift platform 130 in the tilted position and leads to the support surface. Ramp extension 170 provides a transition piece to further minimize any height difference when rolling a load between the support surface and the rear edge of lift platform 130. Ramp extension 170 may also be used to compensate for variances in the rear edge height which may vary based on the use of different length lift platforms. Ramp extension 170 has an approximately triangular profile with an angled upper surface 172 and a flat lower surface 174. Ramp extension 170 is connected to the rear edge of lift platform 130. In certain embodiments, ramp extension 170 is pivotally connected to the upper rear edge of lift platform 130, for instance via a piano hinge 178. The pivotal connection allows the ramp extension to slightly pivot upward when lift platform 130 is in a tilted position, so that lower surface 174 is parallel to and flush with floor 25. This minimizes a potential stress load at the junction of the lift platform 130 and ramp extension 170. Ramp extension 170 may also be optionally folded into a stored position when lift platform 130 is elevated.

In alternate embodiments, one or both of forward ladder rail 152 and rear ladder rail 154 may define more than one tilt notch 153, 155 near the ladder rail lower ends. This may allow a user to selectively place the lift platform at different angular orientations θ. Alternately, yet less desired, rear tilt notch 155 could be not used or omitted and the rear edge of lift platform 130 could rest on the support surface.

When forward support 132 is higher than rear support 136 in the lowered position, there may be some slight slack in front lift chain 142. The slack is taken up when lift platform 130 is raised. In alternate embodiments a chain tensioner or similar mechanism may be used to yieldingly maintain tension on the slack portion of the chain. When the lift platform is raised, rear support 136 will rise from the height of rear tilt notch 155 until it equal in height with front tilt notch 153 and forward support 132. At that position and above, lift platform 130 will be supported in a level arrangement front to rear, parallel to the support surface. Lift platform 130 is maintained in a level arrangement within the range of raised positions.

A representative controller 180 is illustrated in FIG. 9. Controller 180 is operatively connected to vehicle lift 110, for instance via a wired or wireless connection. In the illustrated embodiment, controller 180 include an up button 182, which can be activated to cause vehicle lift 110 to raise lift platform 130. Controller 180 also includes a down button 184, which can be activated to cause vehicle lift 110 to lower lift platform 130. Controller 180 also includes an actuator button 186 operable to activate actuators 168 to disengage the latching mechanisms 160. As a safety mechanism, a user may need to continuously hold actuator button 186 while lowering lift platform 130.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed:

1. A vehicle lift, comprising:
   a. a forward support post and a rear support post arranged on a support surface;
   b. a lift platform extending between the forward support post and the rear support post;
   c. a forward support engaged with the forward support post and supporting a forward portion of the lift platform;
   d. a rear support engaged with the rear support post and supporting a rear portion of the lift platform;
   e. a front tilt notch defined adjacent a lower end of the forward support post and a rear tilt notch defined adjacent a lower end of the rear support post, wherein the front tilt notch is arranged at a height greater than the height of the rear tilt notch; and,
   f. wherein the lift platform is movable to a lowered position wherein the forward support engages the front tilt notch and the rear support engages the rear tilt notch so that the lift platform is supported at an angle relative to the support surface.

2. The vehicle lift of claim 1 wherein:
   a. the front tilt notch is defined in a forward ladder rail arranged in the forward support post and the rear tilt notch is arranged in a rear ladder rail arranged in the rear support post;
   b. the forward ladder rail and the rear ladder rail each defining a plurality of support notches extending along a portion of a vertical length of each ladder rail; and,
   c. wherein the lift platform is movable to a plurality of raised positions wherein in each raised position the forward support engages one of the plurality of support notches in the forward ladder rail and the rear support engages a paired one of the plurality of support notches in the rear ladder rail so that the lift platform is supported parallel to the support surface.

3. The vehicle lift of claim 2, comprising a front latch mechanism in the forward support arranged to selectively engage the front tilt notch or one of the plurality of support notches in the forward ladder rail corresponding to the height of the lift platform and a rear latch mechanism in the rear support arranged to selectively engage the rear tilt notch or one of the plurality of support notches in the rear ladder rail corresponding to the height of the lift platform.

4. The vehicle lift of claim 3, wherein the front latch mechanism is biased to rotate into a support position engaging the front tilt notch and the plurality of support notches in the forward ladder rail as the front latch mechanism moves into alignment with each notch.

5. The vehicle lift of claim 4, wherein the front latch mechanism is mounted to the forward support via a pivot axle, wherein the pivot axle is offset from a center of mass of the latch mechanism, and wherein a mass of the latch mechanism biases the front latch mechanism to the support position.

6. The vehicle lift of claim 5, comprising an electrically operated actuator operable to disengage the front latch mechanism from the forward ladder rail.

7. The vehicle lift of claim 3, comprising a single front latch mechanism and a single rear latch mechanism arranged on the same lateral side of the lift platform.

8. The vehicle lift of claim 1, comprising a hydraulic cylinder coupled to a front lift linkage extending between the hydraulic cylinder and the forward support and a rear lift linkage extending between the hydraulic cylinder and the rear support, wherein extension and retraction of the hydraulic cylinder raises and lowers the forward support, the rear support and the lift platform.

9. The vehicle lift of claim 1 wherein a lower rear edge of the lift platform is spaced above the support surface when the lift platform is in the lowered position.

10. The vehicle lift of claim 1 wherein the vehicle lift is arranged within a trailer.

11. A vehicle lift, comprising:
  a. a plurality of support posts arranged on a support surface, including a forward support post and a rear support post;
  b. a lift platform operably supported by the support posts and movable along a height of the posts between one or more raised positions wherein the lift platform is parallel to the support surface and a lowered position;
  c. a forward support engaging the forward support post and supporting a forward portion of the lift platform;
  d. a rear support engaging the rear support post and supporting a rear portion of the lift platform; and,
  e. the forward support post defining a front tilt position engaged by the forward support when the lift platform is in the lowered position and the rear support post defining a rear tilt position engaged by the rear support when the lift platform is in the lowered position, wherein the front tilt position is higher in height than the rear tilt position so that the lift platform is arranged at an angular orientation relative to the support surface.

12. The vehicle lift of claim 11 comprising:
  a. a forward ladder rail arranged in the forward support post and a rear ladder rail arranged in the rear support post;
  b. the forward ladder rail and the rear ladder rail each defining a plurality of support notches extending along a portion of a vertical length of each ladder rail, wherein each one of the plurality of support notches in the forward ladder rail is paired with one of the plurality of support notches in the rear ladder rail;
  c. a front tilt notch defined below the support notches in the forward ladder rail and a rear tilt notch defined below the support notches in the rear ladder rail, wherein the front tilt notch is arranged at a height above the rear tilt notch;
  d. a front latch mechanism in the forward support arranged to selectively engage the forward ladder rail corresponding to the height of the lift platform and a rear latch mechanism in the rear support arranged to selectively engage the rear ladder rail corresponding to the height of the lift platform; and
  e. wherein the lift platform is supported at an angle to the support surface when the front latch mechanism engages the front tilt notch and the rear latch mechanism engages the rear tilt notch.

13. The vehicle lift of claim 12, comprising:
  a. wherein the support posts comprise a pair of lift-side posts on one lateral side of the lift platform and a pair of support-side posts on the opposite lateral side of the lift platform;
  b. wherein the front latch mechanism and the rear latch mechanism each engage one of the pair of lift-side posts;
  c. a forward lateral support chain having
    i. an upper end anchored adjacent an upper end of one of the pair of support-side posts,
    ii. an interim length extending downward in one of the pair of support-side posts, extending laterally from one of the pair of support-side posts to one of the pair of lift-side posts under the lift platform and extending downward in one of the pair of lift-side posts, and,
    iii. a lower end anchored adjacent a lower end of one of the pair of lift-side posts;
  d. a rear lateral support chain having
    i. an upper end anchored adjacent an upper end of one of the pair of support-side posts,
    ii. an interim length extending downward in one of the pair of support-side posts, extending laterally from one of the pair of support-side posts to one of the pair of lift-side posts under the lift platform and extending downward in one of the pair of lift-side posts, and,
    iii. a lower end anchored adjacent a lower end of one of the pair of lift-side posts; and,
  e. wherein the lift platform translates along the interim length of the forward support chain and the rear support chain in response to changes in the height of the lift platform.

14. The vehicle lift of claim 12, comprising a single front latch mechanism and a single rear latch mechanism arranged on the same lateral side of the lift platform.

15. The vehicle lift of claim 14, comprising a hydraulic cylinder coupled to a front lift linkage extending between the hydraulic cylinder and the forward support and a rear lift linkage extending between the hydraulic cylinder and the rear support, wherein extension and retraction of the hydraulic cylinder raises and lowers the forward support, the rear support and the lift platform.

16. The vehicle lift of claim 15, wherein the front lift linkage and the rear lift linkage are leaf chains.

17. The vehicle lift of claim 11, wherein a lower rear edge of the lift platform is spaced above the support surface when the lift platform is in the lowered position.

18. The vehicle lift of claim 17, comprising a ramp extension pivotally coupled to an upper rear edge of the lift platform wherein the ramp extension includes a lower surface which is parallel to and flush with the support surface when the lift platform is in the lowered position.

19. A vehicle lift on a support surface, comprising:
  a. front and rear lift-side posts on one lateral side of a lift platform and front and rear support-side posts on the opposite lateral side of the lift platform, wherein the lift platform is movable in height between one or more raised positions wherein the lift platform is parallel to the support surface and a lowered position;
  b. a forward support engaging the forward support post and supporting a forward portion of the lift platform;
  c. a rear support engaging the rear support post and supporting a rear portion of the lift platform;
  d. a hydraulic cylinder coupled to a front lift linkage extending to the forward support and a rear lift linkage extending to the rear support, wherein extension and retraction of the hydraulic cylinder raises and lowers the forward support, the rear support and the lift platform; and, e. the front lift-side post defining a front tilt position engaged by the forward support when the lift platform is in the lowered position and the rear lift-side post defining a rear tilt position engaged by the rear support when the lift platform is in the lowered position, wherein the front tilt position is higher in height than the rear tilt position.

20. The vehicle lift of claim 19, comprising:

a. wherein the front lift-side post and the rear lift-side post each define a plurality of support notches above the front tilt position and the rear tilt position, wherein each one of the plurality of support notches in the front lift-side post is paired with one of the plurality of support notches in the rear lift-side post;

b. wherein latch mechanisms in the forward support and the rear support engage pairs of support notches corresponding to the one or more raised positions of the lift platform;

c. wherein the latch mechanisms prevent the lift platform from moving to a lower position unless the latch mechanisms have been selectively disengaged; and, d. electrically operated actuators operable to selectively disengage the latch mechanisms from the front lift-side post and the rear lift-side post.

* * * * *